United States Patent Office

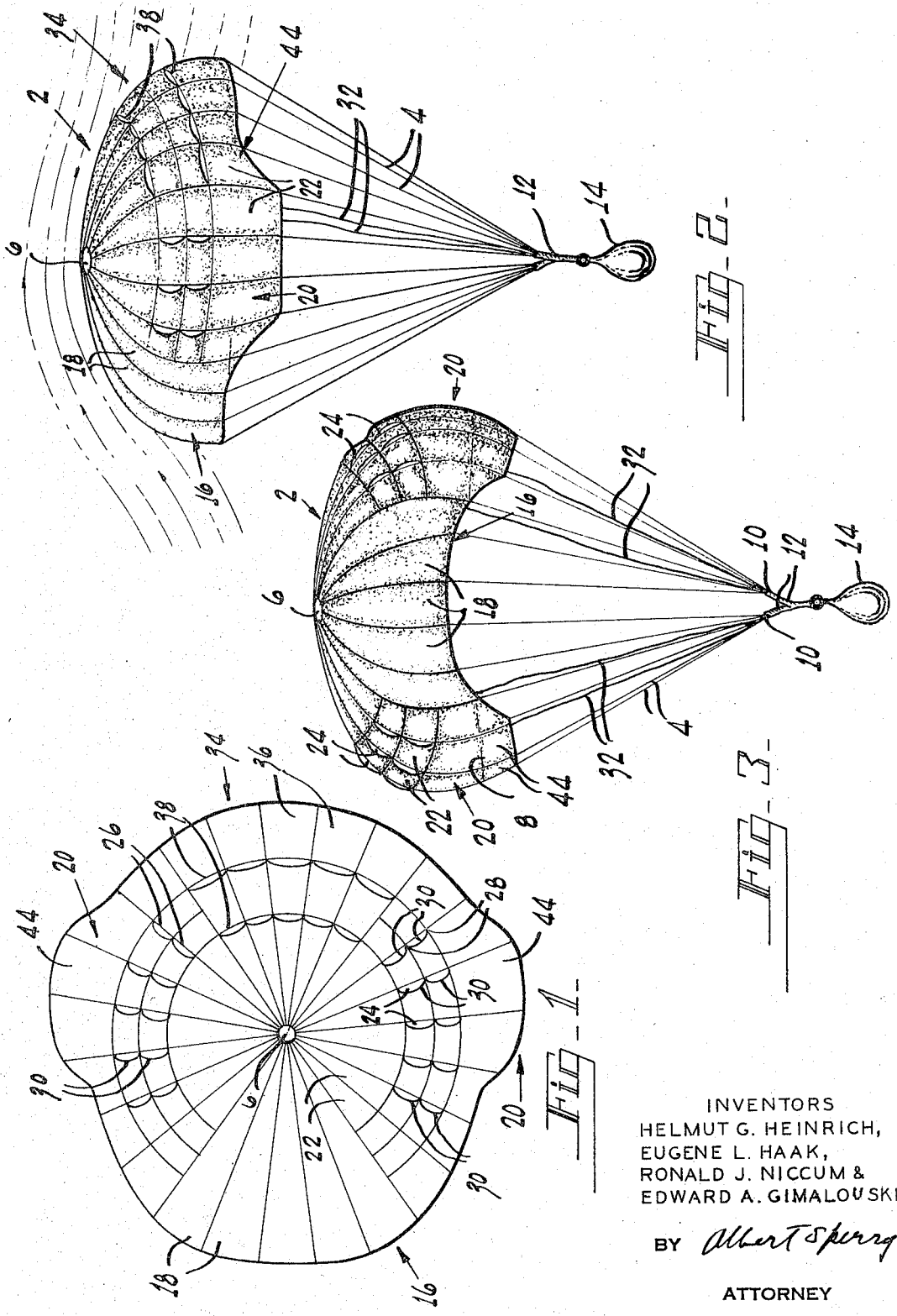
INVENTORS
HELMUT G. HEINRICH,
EUGENE L. HAAK,
RONALD J. NICCUM &
EDWARD A. GIMALOUSKI
BY Albert T Sperry
ATTORNEY

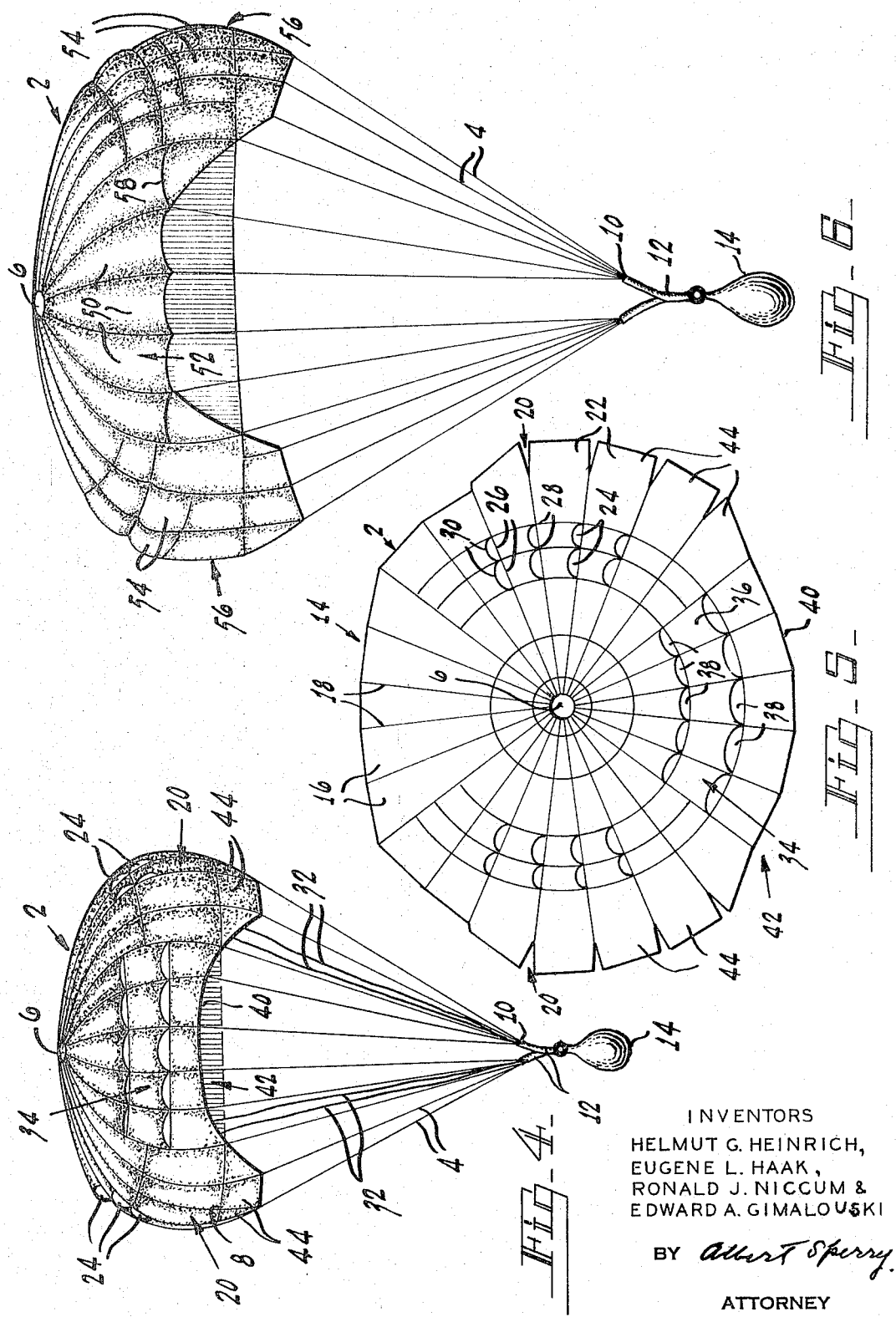

3,298,639
Patented Jan. 17, 1967

3,298,639
GLIDING PARACHUTE
Helmut G. Heinrich, Eugene L. Haak, and Ronald J. Niccum, Minneapolis, Minn., and Edward A. Gimalouski, Manchester, Conn., assignors to Pioneer Parachute Company, Inc., Manchester, Conn., a corporation of Delaware
Filed Feb. 8, 1965, Ser. No. 430,930
3 Claims. (Cl. 244—145)

This invention relates to parachutes having improved gliding characteristics whereby they may be caused to travel a greater horizontal distance from their point of release so that they may descend closer to a predetermined point or in more favorable terrain than has been possible heretofore.

In accordance with physical laws, a freely floating parachute moves in such a way that the line of the action of the suspended weight coincides with the direction of the resultant aerodynamic force. In general, the aerodynamic forces consist of lift and drag whereas by definition, the lift is exerted in a direction perpendicular to the direction of the free stream velocity while the drag coincides with this direction. Thus, a parachute which descends vertically has only a drag force and no lift component. The longitudinal axis of the parachute then coincides with the direction of its descent and such a parachute is said to be stable at zero angle of attack.

Whereas parachutes which are stable at zero angle of attack are very useful for a great number of purposes, there are applications in which considerable forward motion of the descending parachute is desired. One also may wish to permit the parachutist or a suspended mechanical load to change the direction of its forward motion. Such a parachute is said to be a gliding and controllable or steerable parachute.

In view of the definition above, the longitudinal axis of a gliding parachute forms an angle with the direction of the free stream and will have a stable angle of attack which depends on the ratio of the lift and drag components at some angle between zero and a large angle up to, say 80 even 85 degrees with respect to the vertical. The supplementary angle, measured with respect to the horizon, is then called the gliding angle.

It is apparent that a gliding and controllable parachute will be particularly useful when its gliding angle is relatively small. In view of mechanics of flight, such a parachute canopy should develop a relatively large lift component combined with a drag component as small as possible. For example, a parachute whose lift and drag components are equal will have a gliding angle of 45 degrees and such a parachute will glide as far forward as it descends in altitude, but if the lift component can be further increased and the drag decreased, it may glide much farther.

The U.S. patent to Lemoigne No. 3,099,426 shows and describes a type of parachute which is capable of gliding and being steered to some extent for more accurate landing thereof in a desired location. While such parachutes have been employed successfully for some purposes, extensive tests and usage thereof have disclosed the fact that the angle of attack of the parachute canopy, the lift to drag ratio, and the horizontal distance which the parachute will travel are insufficient for many important applications. Thus, the stable angle of attack of the Lemoigne parachute has been found to be about 40° to 42°, the lift to drag ratio (hereinafter referred to as $L/D$) is about 0.84 to 0.90, and such a parachute when released at an altitude of 1000 feet will travel horizontally a distance substantially less than 1000 feet.

It has now been found that parachutes, which may utilize some features of the Lemoigne canopy construction, may nevertheless be constructed so as to overcome limitation and objections to such designs and embody important new principles of operation. As a result, parachutes embodying the present invention glide from 20% to 30% farther horizontally and have a stable angle of attack up to 47° or more, and the $L/D$ of such parachutes ranges from about 1.04 to 1.10. Therefore, it is possible to provide the parachute with various types of automatic controls and electronic "homing" equipment by means of which the parachute and its cargo can be caused to land within a predetermined area or closer to a target that is much more distant from the point of deployment than has been possible heretofore. In the alternative, the parachute can be manipulated manually by a parachutist for accurate landing in a desired location more distant from its point of deployment.

These results are attained by providing the parachute canopy with a relatively large, closed, and substantially smooth area, having the characteristics of an airfoil, located in the front portion thereof and over which "attached" air flow will take place to develop a high lift component. On the other hand the side and rear portions of the canopy are provided with air exhaust openings through which air may flow outward from beneath the canopy in a manner to create jet reaction forces which may be utilized to propel and steer the parachute. The combination and interaction of the lift and thrust forces thus developed enable the parachute to glide relatively great distances and to be guided most effectively during descent.

The suspension lines in most instances are of equal length from the skirt to the load points, but at times, it is desirable to vary the length of the front or rear suspension lines by manipulation during descent in order to vary the angle of the plane of the inlet of the canopy with respect to the longitudinal axis of the parachute. Such manipulation alters the angle of attack and therefore alters the $L/D$ so as to change the glide angle of the parachute.

Accordingly, the principal objects of the present invention are to increase the angle of attack of parachutes, to provide parachutes which possess a high lift to drag ratio, to increase the horizontal distance which a parachute may travel after release and deployment thereof, to facilitate the guiding of parachutes during descent, and to provide parachutes which have a canopy presenting a relatively smooth, solid, or closed front portion in combination with air exhaust vents or openings at the sides and to the rear of said portion.

These and other objects and features of the present invention will appear from the following description thereof wherein reference is made to the figures of the accompanying drawings.

In the drawings:

FIG. 1 is a plan view of a typical parachute canopy embodying the present invention;

FIG. 2 is a side elevation of the canopy shown in FIG. 1 indicating air flow about the canopy;

FIG. 3 is a front view of a parachute having a canopy of the type illustrated in FIG. 1;

FIG. 4 is a rear view of the parachute of FIG. 1;

FIG. 5 is a plan view of the fabric elements embodied in the parachute of FIG. 1; and FIG. 6 is a front view of an alternative form of parachute canopy embodying the present invention.

In that form of the invention chosen for purposes of illustration in FIGS. 1 to 5, the parachute has a canopy 2 provided with suspension lines 4 which extend across the peak 6 of the canopy and downward from the skirt 8 of the canopy to suspension points 10 on load supporting webbing or straps 12 to which a load 14 is attached.

As shown in the plan view illustrated in FIG. 1, the canopy embodies a front portion 16 which occupies approximately 20 to 50% of the area of the canopy and is composed of solid gores of fabric 18 which are stitched or other wise secured together throughout the length of the adjacent radially extending sides thereof.

The side portions 20 of the parachute canopy at opposite sides of the peak 6 and closed front portion 16 thereof are composed of gores 22 which are stitched or otherwise connected together adjacent the skirt 8 of the canopy and along a portion only of the adjacent radially extending edges of the gores. The side portions are thus provided with radially extending air exhaust vents 24 at various locations between the edges of the gores 22 through which air may flow from beneath canopy to the exterior thereof. Furthermore, the length of the material which forms the front sides 26 of the vents 24, between the points of attachment 28 of the adjacent gores 22, may be greater than the length of the material which forms the rear sides 30 of the vents 24. When the vents are thus constructed, the front sides 26 thereof are caused to bow outwardly during descent of the parachute more than the rear sides 30 of the vents so that the outwardly flowing air serves to give the vents a rearwardly directed shape as shown in FIGS. 2 and 3. The resulting rearwardly directed jets of air which issue from the vents 24 serve to impart a forward thrust to the parachute during descent and thereby increase the gliding effect of the canopy.

The number, length and location of the various vents 24 in the side portions 20 of the parachute canopy can be varied considerably to attain the most effective results in parachute canopies of different sizes and in parachutes designed for particular applications and uses. Furthermore, vent control lines 32 may be connected to the canopy material at the front sides 26 of any one or more vents 24 and extend downward to the suspension point 8 or else where for manipulation by the parachutist or control mechanism. In this way, the vents 24 can be opened or closed for steering of the parachute during descent or to attain increased or controlled gliding depending upon the direction of the wind, the angle of descent or the location of the target or terrain where it is desired to land the parachute and its load.

In order further to increase the glide and aid in control of the parachute, the rear portion 34 of the canopy is provided with one or more openings, cut-out portions or vents which serve as air discharge openings through which air may flow in a rearward direction from beneath the canopy. The jet or jets of air thus expelled from the parachute serve to impart a further forward thrust to the parachute so as to increase its gliding characteristics. Thus in constructing a parachute embodying the present invention, the gores or panels 36 which occupy the rear portion 34 of the canopy are provided with one or more horizontal or circumferentially extending vents slots 38. The material forming the upper sides of the vent slots 38 may be somewhat longer than the material on the lower sides of the slots to allow the slots to assume the form of rearwardly directed vents as described above in connection with the vents 24 of the side portions 20 of the parachute canopy.

The gores 36 which occupy the rear portion 34 of the canopy may, in some instances, be somewhat shorter than the gores in the front and side portions of the canopy. The skirt of the canopy then will be curved upwardly at the rear of the parachute as shown at 40 in FIG. 4 so as to present a relatively large air discharge opening 42 which is permanently open over an extended area at the rear of the canopy. However, the latter configuration is not required and for some purposes may not even be desirable.

In order to increase the stability of the parachute during descent and aid in steering and guiding the same, the side portions 20 of the canopy are preferably provided with stabilizing panels 44 which extend downwardly from the skirt 8 of the parachute canopy. These stabilizing panels also serve to aid in turning the parachute about its vertical axis and into the wind as the parachute descends. They also serve to define a channel for the air which extends in the direction of glide from the front to the rear of the parachute canopy so as to establish and maintain the directional characteristics of the assembly.

With this construction, as shown in FIG. 2, an extended area of "attached" air flow is established over upper surface of the solid, or closed, smooth front portion 16 and peak 6 of the parachute canopy. The contour of the canopy and its lift characteristics then are comparable to those of a conventional aeroplane wing. Whereas an aircraft develops its forward driving force from a power plant, the parachutes of the present invention obtain their forward driving force from the jet reaction of air flowing outward from beneath the canopy through the various air exhaust vents 24 in the side portions 20 of the canopy and the rearwardly facing air exhaust vents or openings 38 and 42 in the rear portion 34 of the canopy. The interaction of the lift and propulsion forces thereby developed cause the parachute to move forward, or glide, in a predetermined direction and by manipulation of the vent control lines 32 which permit selective closing of the radially extending air exhaust vents 24 in the side portions 20 of the canopy, the parachute can be made to rotate about its longitudinal axis for steering in any desired direction.

Extensive tests of parachutes constructed as described above have demonstrated that the lift to drag ratio of the parachute is very substantially increased over that of parachutes of the prior art. Accordingly, the $L/D$ of the parachutes may be consistently maintained above 1.0 and in some instances approaches 1.3. As a result, a parachute constructed in accordance with the present invention when released at an altitude of 1000 feet may glide horizontally a distance substantially in excess of 1000 feet, and they may be guided to a predetermined target or location with remarkable accuracy.

In some tests on parachutes embodying the present invention, it has been found that the leading edge of the front portion 16 tends to buckle inward or collapse as shown in dotted lines in FIG. 2, especially when the parachute has a high angle of attack. In order to overcome this objection, it has been found in most instances to be advantageous to utilize solid gores in making up the front portion of the parachute canopy which are somewhat shorter than the gores employed in forming the side portions, or both the side and rear portions of the canopy. Therefore, in the canopy illustrated in FIG. 6, the gores 50 in the front portion 52 are made significantly shorter than the gores 54 which make up the vented side portions 56 of the canopy. The portion 58 of the skirt of the canopy at the lower or outer edges of the front portion 52 of the canopy then will curve upwardly and present a front air inlet opening beneath the skirt at the front of the parachute. Nevertheless, in order to attain the advantages of the present invention, the front portion 52 of the parachute canopy above the skirt portion 58 should be closed or formed of solid gores of material stitched or otherwise secured together throughout the length of the radial edges thereof to establish the desired attached flow over the front of the canopy and develop a high lift to drag ratio.

In some parachutes embodying the present invention, a center line is connected to the peak 6 of the canopy and to one or more of the suspension points 10 and is of a length approximately equal to the length of the suspension lines. The apex of the canopy is then depressed or held inward during descent of the parachute. While this construction is frequently employed, it is not generally used in parachutes dropped from aeroplanes traveling at high speed.

From the foregoing description and drawings, it will be apparent that numerous changes and modifications may be made in the form, size and shape of the parachute canopy and the size and location of vents employed therein may be varied considerably. In view thereof, it should be understood that the particular embodiments of the invention specifically disclosed herein and illustrated in the drawings are intended to be illustrative only and are not intended to limit the scope of the invention.

We claim:

1. A parachute characterized by its ability to glide a horizontal distance after deployment which is at least equal to the altitude of deployment, comprising a canopy with a peak and a skirt and shroud lines extending downward from the skirt to at least one point for attachment of a load, the canopy having a front portion, side portions and a rear portion, the front portion being composed of a plurality of solid gores secured together throughout substantially the entire length thereof, to create a condition of attached air flow over the canopy when the parachute glides forwardly, the side portions of the canopy being provided with a plurality of rearwardly directed vent openings, and the rear portion of the canopy embodying a plurality of gores which are shorter than the gores in the side portions of the canopy and cooperate to present a permanently open rearwardly directed air discharge opening beneath the lower edges thereof through which air will be caused to flow rearwardly from the interior to the exterior of the canopy so as to exert a forwardly directed jet reaction force on the canopy.

2. A parachute as defined in claim 1 wherein the canopy is made up of a plurality of gores of material with the gores in the front portion of the canopy being shorter than the gores in the side portions of the canopy, whereby the skirt of the canopy at the front thereof is curved upwardly above the skirt at the side portions of the canopy.

3. A parachute canopy as defined in claim 1 wherein the gores of material in the front and rear portions of the canopy are shorter than the gores of material in the side portions of the canopy whereby the portions of the skirt of the canopy at both the front and rear thereof are curved upwardly above those portions of the skirt of the parachute at the sides thereof.

References Cited by the Examiner

UNITED STATES PATENTS

| 3,043,543 | 7/1962 | Istel et al. | 244—152 |
| 3,099,426 | 7/1963 | Lemoigne | 244—145 |

FOREIGN PATENTS 1,381,829  11/1964  France.

MILTON BUCHLER, *Primary Examiner.*

ALFRED E. CORRIGAN, *Examiner.*